(12) United States Patent
Lenhart et al.

(10) Patent No.: US 11,511,418 B2
(45) Date of Patent: Nov. 29, 2022

(54) UNIFORM REMOTE CONTROL OF MOBILE PLATFORMS

(71) Applicant: Robert Bosch GmbH, Stuttgart (DE)

(72) Inventors: David Lenhart, Lehrensteinsfeld (DE); Matthias Figura, Bretzfeld (DE); Philipp Gmaehle, Flein (DE); Raphael Knorpp, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 17/353,422

(22) Filed: Jun. 21, 2021

(65) Prior Publication Data
US 2022/0001534 A1    Jan. 6, 2022

(30) Foreign Application Priority Data

Jul. 2, 2020 (DE) .................... 10 2020 208 297.9

(51) Int. Cl.
*H04L 69/164* (2022.01)
*B25J 9/16* (2006.01)
*B25J 9/00* (2006.01)
*B25J 13/00* (2006.01)

(52) U.S. Cl.
CPC ........... *B25J 9/1658* (2013.01); *B25J 9/0084* (2013.01); *B25J 9/1661* (2013.01); *B25J 13/006* (2013.01); *H04L 69/164* (2013.01)

(58) Field of Classification Search
CPC ..... H04L 69/164; B25J 13/006; B25J 9/1661; B25J 9/0084; B25J 9/1658
See application file for complete search history.

(56) References Cited

U.S. PATENT DOCUMENTS

| | | | | |
|---|---|---|---|---|
| 8,918,540 B2* | 12/2014 | Corman | ................. | H04L 69/08 708/204 |
| 10,091,025 B2* | 10/2018 | Chaturvedi | ......... | H04L 12/4625 |
| 10,374,998 B2* | 8/2019 | Mei | ....................... | H04L 51/214 |
| 10,462,306 B1* | 10/2019 | Siebels | .................... | H04W 4/24 |
| 2006/0123135 A1* | 6/2006 | Lu | ......................... | H04L 51/066 709/246 |

(Continued)

OTHER PUBLICATIONS

"USB." In: Wikipedia, the free encyclopedia. Jun. 29, 2020 Version. URL: https://en.wikipedia.org/w/index.php?title=USB&oldid=96517 4889.

(Continued)

*Primary Examiner* — Mohamed A. Wasel
(74) *Attorney, Agent, or Firm* — Norton Rose Fulbright US LLP; Gerard Messina

(57) ABSTRACT

A data processing system for controlling different types of mobile platforms. The data processing system includes an abstraction component, a standardization component and a driver management. The abstraction component is designed to be connected to one or to multiple platforms, to determine types of mobile platforms, to indicate the types to the driver management and to use drivers provided by the driver management in order to convert messages between an interface to the standardization component and interfaces to the mobile platforms, and/or in order to activate functions of the mobile platforms and of the standardization component. The interfaces of the abstraction component to the mobile platforms include interfaces to the software components of the mobile platforms.

12 Claims, 2 Drawing Sheets

(56) References Cited

U.S. PATENT DOCUMENTS

| | | | |
|---|---|---|---|
| 2008/0070495 A1* | 3/2008 | Stricklen ................. | H04W 8/20 |
| | | | 455/3.01 |
| 2012/0041592 A1 | 2/2012 | Murray, IV et al. | |
| 2017/0288904 A1* | 10/2017 | Chaturvedi ......... | H04L 65/1053 |
| 2021/0229591 A1* | 7/2021 | Dannar .................. | B60L 50/60 |
| 2022/0001534 A1* | 1/2022 | Lenhart ................. | B25J 13/006 |

OTHER PUBLICATIONS

"Device driver." In: Wikipedia, the free encyclopedia. Jun. 25, 2020 Version. URL: https://en.wikipedia.org/w/index.php?title=Device_driver&oldid=964387283.

"Message-oriented middleware." In: Wikipedia, the free encyclopedia. Jun. 22, 2020 Version. URL: https://en. wikipedia.org /w/index.php?title=Message-orientedmiddleware&oldid=96396027.

* cited by examiner

UNIFORM REMOTE CONTROL OF MOBILE PLATFORMS

CROSS REFERENCE

The present application claims the benefit under 35 U.S.C. § 119 of German Patent Application No. DE 102020208297.9 filed on Jul. 2, 2020, which is expressly incorporated herein by reference in its entirety.

FIELD

The present invention relates to a data processing system for controlling a multitude of types of mobile platforms, the data processing system including an abstraction component, a standardization component and a driver management. The present invention further relates to a computer-implemented method, to a computer program and to a computer-readable memory medium.

BACKGROUND INFORMATION

Mobile platforms are used today in a wide variety of forms. A mobile platform may, for example, be a mobile robot or a vehicle. The present invention relates, in particular, to semi-autonomous and/or fully autonomous mobile platforms. Semi-autonomous mobile platforms, in contrast to autonomous mobile platforms, require more or less frequently an input of a user or of a central control unit for carrying out tasks.

Presently, a suitable software and/or control technology is/are required for controlling mobile platforms, which is/are routinely supplied by the manufacturer of the mobile platforms, together with the mobile platform. This necessity results from the fact that mobile platforms are not subject to any cross-manufacturer standardization.

SUMMARY

The lack of standardization and/or control technology for mobile platforms results in a series of disadvantages. Users must, in particular, be trained in the software and/or control technology. Moreover, the software and/or control technology must be separately maintained.

In addition, the software and/or control technology must be installed and operated. In some cases, different operating systems and/or servers are necessary for such purpose, which results in increased personnel expenditure and/or labor costs.

Mobile platforms such as, for example, robots usually use localization technology, which is designed for detecting their surroundings and, for safety reasons, for detecting humans. In the case of robots, however, problems frequently arise in the detection of other robots, since the latter may have very different sizes, shapes and structures. Errors in the detection of other robots may result in robots colliding or deadlocking.

Robots may be used for a multitude of applications. For example, robots may be used for the transportation of goods. In addition, robots may be used for detecting and reporting events such as the arrival of goods and/or persons. In order to be able to program robots for such applications, it is currently necessary to use a control software that is a function of the type of the robot. Applications in which multiple robots carry out a task in a coordinated manner are therefore difficult if not impossible to implement.

One object of the present invention is to enable a simpler and, in particular, uniform control of mobile platforms. One object of the present invention is further to remotely control mobile platforms, in particular, mobile platforms of different types, in a coordinated manner using a central control system. In this way, it is possible to implement applications, in which different robots interact to fulfill a task. Mobile platforms are, in particular, to be assisted in carrying out their tasks using pieces of information about their location, the condition of the operational environment and the position of other mobile platforms.

One first aspect of the present invention relates to a data processing system for controlling a multitude of types of mobile platforms. In accordance with an example embodiment of the present invention, the data processing system includes an abstraction component, a standardization component and a driver management. The abstraction component is designed to be connected to a first mobile platform, to determine a first type of the first mobile platform, and to communicate with the driver management in order to indicate to the driver management the first type of the first mobile platform. The driver management is designed to provide a first driver as a function of the indicated first type of the abstraction component. The abstraction component includes a first interface to the first mobile platform and a second interface to the standardization component and is designed to convert messages between the first interface and the second interface, to activate functions of the first mobile platform via the first interface and/or to activate functions of the standardization component via the second interface using the first driver provided by the driver management. In this case, the first interface of the abstraction component includes an interface to a software component of the first mobile platform.

In accordance with an example embodiment of the present invention, the data processing system may include a central data processing device and a first mobile data processing device. The first mobile data processing device may be permanently connected to the first mobile platform. The first interface may, in particular, connect the first mobile platform to the first mobile data processing device, and the first mobile data processing device may be connected via a wireless message system to the central data processing device.

The abstraction component, the standardization component and the driver management are preferably software components. It is also possible, however, that the abstraction component, the standardization component and/or the driver management are fully or partially implemented by dedicated hardware components.

The first mobile data processing device may be a separate data processing device, or the first mobile data processing device may be integrated into a data processing device of the first mobile platform. The first mobile data processing device includes preferably a processor such as, for example, a microprocessor, a microcontroller or an application-specific processor. In addition, the first mobile data processing device includes preferably one or multiple memory units. The first mobile data processing device includes, in particular, a non-volatile memory unit. The first data processing device may include a multitude of further components, for example, a communication unit, via which the first mobile data processing device is able to communicate with the central data processing device.

The central data processing device also includes preferably a processor such as, for example, a microprocessor, a microcontroller or an application-specific processor. The central data processing device further preferably includes one or multiple memory units. The central data processing device includes, in particular, a non-volatile memory unit. The central data processing device may include a multitude of further components, for example, a communication unit, via which the central data processing device is able to communicate with the first mobile data processing device.

The abstraction component may, in particular, include a central abstraction element and a first mobile abstraction element. In this case, the central data processing device may include the central abstraction element, the driver management and the standardization component. The first mobile data processing device may further include the first mobile abstraction element. The central abstraction element, the driver management and the standardization component are, in particular, software components, which are implemented by the central processing device. Furthermore, the first mobile abstraction element may be implemented as a software component by the first mobile data processing device.

Other data processing structures are possible. For example, the abstraction component, the standardization component and/or the driver management may be fully or partially implemented on the first mobile platform.

The first mobile platform may, for example, be a robot or a vehicle such as, for example, a passenger car. The first mobile platform is, in particular, a semi-autonomous or fully autonomous mobile platform.

The abstraction component may further be designed to communicate with the driver management in order to ensure the compatibility of a mobile platform with the data processing system and to prevent an unintended connection to an incompatible mobile platform.

The driver management may be designed to store drivers for a multitude of mobile platforms. The driver management is preferably designed to store the drivers in a cryptographically signed form. It is also possible that the drivers are stored on a further data processing device, which the driver management accesses in order to provide the abstraction component with a first driver as a function of the indicated first type.

In this case, the drivers are designed to convert messages between a mobile platform and the standardization component, to activate functions of the mobile platform and/or to activate functions of the standardization component. The first driver provided by the driver management is preferably implemented as part of the first mobile abstraction element by the first mobile data processing device. It is also possible, however, that the first driver provided by the driver management is implemented as part of the central abstraction element by the central data processing device. It is further possible that the first driver provided by the driver management includes a first mobile driver component and a first central driver component, the first mobile driver component being implemented as part of the first mobile abstraction element by the first mobile data processing device, and the first central driver component being implemented as part of the central abstraction element by the central data processing device.

The drivers for the mobile platforms are written preferably in a flow-based programming language, which is suitable for the dynamic and state-based communication with mobile robots. For example, the drivers for the mobile platforms may be written in a programming language that is oriented to robot operating system (ROS) standards. However, the user of the present invention is largely free to choose the programming language and the implementation of the interfaces for the driver.

The first driver may be set on a software that has been provided by the manufacturer, for example, for controlling the first mobile platform. The drivers managed by the driver management may therefore be created without detailed knowledge of the hardware of the different types of mobile platforms.

The data processing system may, in particular, be designed to activate a steering system, a drive system, and/or a brake system of the first mobile platform.

According to one specific embodiment of the present invention, the abstraction component is designed to be connected to further mobile platforms, to determine types of the further mobile platforms, and to indicate to the driver management the types of the further mobile platforms. The driver management is further designed to provide further drivers for the abstraction component as a function of the indicated types of the further mobile platforms. The abstraction component includes further interfaces to the further mobile platforms and is designed to convert messages between the second interface and the further interfaces to the further mobile platforms, to activate functions of the further mobile platforms via the further interfaces and/or to activate functions of the standardization component via the second interface using the further drivers provided by the driver management.

The data processing system may thus include further mobile data processing devices, which are connected to the further mobile platforms. The further interfaces may, in particular, connect the further mobile platforms to the further mobile data processing devices, and the further mobile data processing devices may be connected via wireless message systems to the central data processing device.

The further mobile data processing device may be separate data processing devices, or the further mobile data processing devices may be integrated into data processing devices of the further mobile platforms. The further mobile data processing devices include, in particular, processors, memory units and communication units.

The abstraction component may, in particular, include further mobile abstraction elements, the further mobile data processing devices each including one further mobile abstraction element. The further mobile abstraction elements may, in particular, be implemented as software components by the further mobile data processing devices.

Other data processing structures are possible. For example, the abstraction component, the standardization component and/or the driver management may be designed decentrally on multiple mobile platforms.

According to one further specific embodiment of the present invention, the standardization component is designed to provide a control of the first mobile platform, which is a function of a position of the first mobile platform, of positions of further mobile platforms connected to the abstraction component and/or of a condition of the surroundings of the first mobile platform.

The standardization component may, in particular, be designed to send messages to the first mobile platform via the abstraction component, or to activate functions of the first mobile platform via the abstraction component, in order to control the first mobile platform as a function of the position of the first mobile platform, of positions of further mobile platforms and/or of the condition of the surroundings of the first mobile platform.

It is also possible that the standardization component sends messages to the first mobile platform via the abstraction component in order to inform the first mobile platform of its position, of positions of further mobile platforms and/or of the condition of the surroundings, so that the first mobile platform is able to plan its actions and, in particular, its movements as a function of these pieces of information.

According to one further specific embodiment of the present invention, the data processing system includes a central control component, the standardization component being designed to provide via a third interface functions and/or messages for the central control component for controlling mobile platforms. In this case, multiple of the functions and/or messages provided by the standardization component for controlling mobile platforms are independent of a type of the controlled mobile platform.

The central control component may be a part of the central data processing device. It is equally possible, however, that the central control component is part of a data processing device separate from the central data processing device.

For example, a robot at a battery charging station may transmit a first indicator for the instantaneous output voltage of a battery of the robot. The robot may optionally also transmit a second indicator for the maximum output voltage of the battery. The standardization component may be designed to calculate a percentage charge state from the first indicator and optionally from the second indicator.

In another example, the robot may be designed to calculate using quaternions for determining its rotation within a map. In this case, the standardization component may be designed to recalculate this information into vectors.

In yet another example, the robot may be designed to calculate in the imperial coordinate system using feet and/or yards, and the standardization component may be designed to convert these pieces of information into metric units.

In yet another example, the standardization component may be designed to convert complex, in part, inherently recurring and conditional instructions in sequences of simple instructions such as, for example, "Go to" or "Execute action".

According to one further specific embodiment of the present invention, the standardization component is designed to receive messages from the abstraction component via the second interface, to combine the received messages while taking pieces of context information into account, and to forward the combined messages to the central control component via the third interface.

For example, a robot may be designed to send its present position as individual position data in x-, y- and z-directions.

Accordingly, the standardization component may be designed to receive three messages that include three timestamps. The standardization component may be further designed to synchronize the three messages for a fourth timestamp deviating therefrom and preferably close thereto. The standardization component may further be designed to subsequently send a message to the central control component, which contains the position data for the three spatial directions and the fourth timestamp.

In another example relating to position updates including task information, the robot may be designed to only support simple "Go to" instructions. In this case, the standardization component may be designed to establish the achievement of way points or intermediate task objectives from the position updates, from the robot speed and/or from other indications and to communicate these to the central control component.

According to one further specific embodiment of the present invention, the standardization component and the central control component are designed to exchange messages via a first network protocol, the first network protocol being a message-oriented network protocol, which enables both a targeted as well as an open communication according to the queuing principle.

In a message-oriented network protocol, in contrast to a user-oriented network protocol, messages are not necessarily identified via the addresses of the mobile platforms included in the message transmission. The aim or reason for the transmission of a message is not necessarily established in the case of the message-oriented protocol. Instead, the mobile platforms themselves may decide whether and how they respond to a message.

The message-oriented network protocol may enable both a targeted communication to one or to multiple mobile platforms as well as the sending of a broadcast message (open communication).

The queuing principle implies, in particular, the buffering of messages and the processing of messages in the order in which they have been inserted into the queue.

For example, the standardization component and the central control component may be designed to exchange messages via the Advanced Message Queuing Protocol (AMQP), the ZeroMQ Message Transport Protocol (ZMTP), the Extensible Messaging and Presence Protocol (XMPP), Java Messaging Service (JMS), WebSockets, Streaming Text Oriented Messaging Protocol (STOMP) or OpenWire.

According to one further specific embodiment of the present invention, the central abstraction element and the first mobile abstraction element are designed to exchange messages using a second network protocol, the second network protocol being a message-oriented network protocol, which enables both a targeted as well as an open communication according to the queuing principle.

The first mobile abstraction element may thus be designed to provide a standardized interface to the central abstraction element on the basis of the second network protocol. The first mobile abstraction element may, in particular, be designed to send to and/or receive from the central abstraction element messages relating to the first mobile platform. In addition, the first mobile abstraction element may be designed to send and to receive pieces of information regarding setting up, terminating and securing the connection to the central abstraction element.

The central abstraction element may similarly be designed to provide a standardized interface to the first mobile abstraction element on the basis of the second network protocol. In addition, the central abstraction element may be designed to send and to receive pieces of information regarding setting up, terminating and securing the connection to the first mobile abstraction element.

The second network protocol may, for example, be the Message Queuing Telemetry Transport (MQTT) Protocol, ZMTP, XMPP, JMS, WebSockets, STOMP, OpenWire or AMQP.

A second aspect of the present invention relates to a computer-implemented method. In accordance with an example embodiment of the present invention, the method in this case includes the setting up of a connection to a first mobile platform via an abstraction component, the abstraction component including a first interface to the first mobile platform and a second interface to a standardization component. The abstraction component determines a first type of the first mobile platform and sends a first indicator of the first type of the first mobile platform to a driver management. The driver management provides a first driver for the abstraction component as a function of the first indicator. The abstraction component uses the first driver provided by the driver management in order to convert messages between the first interface and the second interface, in order to activate functions of the first mobile platform via the first interface and/or in order to activate functions of the standardization component via the second interface. The first interface of the abstraction component in this case includes an interface to a software component of the first mobile platform.

According to one further specific embodiment of the present invention, the method according to the present invention further includes the setting up of connections to further mobile platforms via the abstraction component, the abstraction component including further interfaces to the further mobile platforms. The abstraction component determines types of the further mobile platforms and transfers further indicators of the types of the further mobile platforms to the driver management. The driver management provides the abstraction component with further drivers as a function of the further indicators. The abstraction component uses the further drivers provided by the driver management in order to convert messages between the second interface and the further interfaces to the further mobile platforms, to activate functions of the further mobile platforms via the further interfaces and/or to activate functions of the standardization component via the second interface. In this case, the further interfaces of the abstraction component to the further mobile platforms may include interfaces to software components of the further mobile platforms.

A third aspect of the present invention relates to a computer program, the computer program including an abstract component, a standardization component and a driver management.

A fourth aspect of the present invention relates to a computer-readable memory medium, on which the computer program according to the present invention is stored.

BRIEF DESCRIPTION OF THE DRAWINGS

Further explanations are presented in greater detail below together with the description of preferred exemplary embodiments of the present invention with reference to figures.

DETAILED DESCRIPTION OF EXAMPLE EMBODIMENTS

Figure 1:
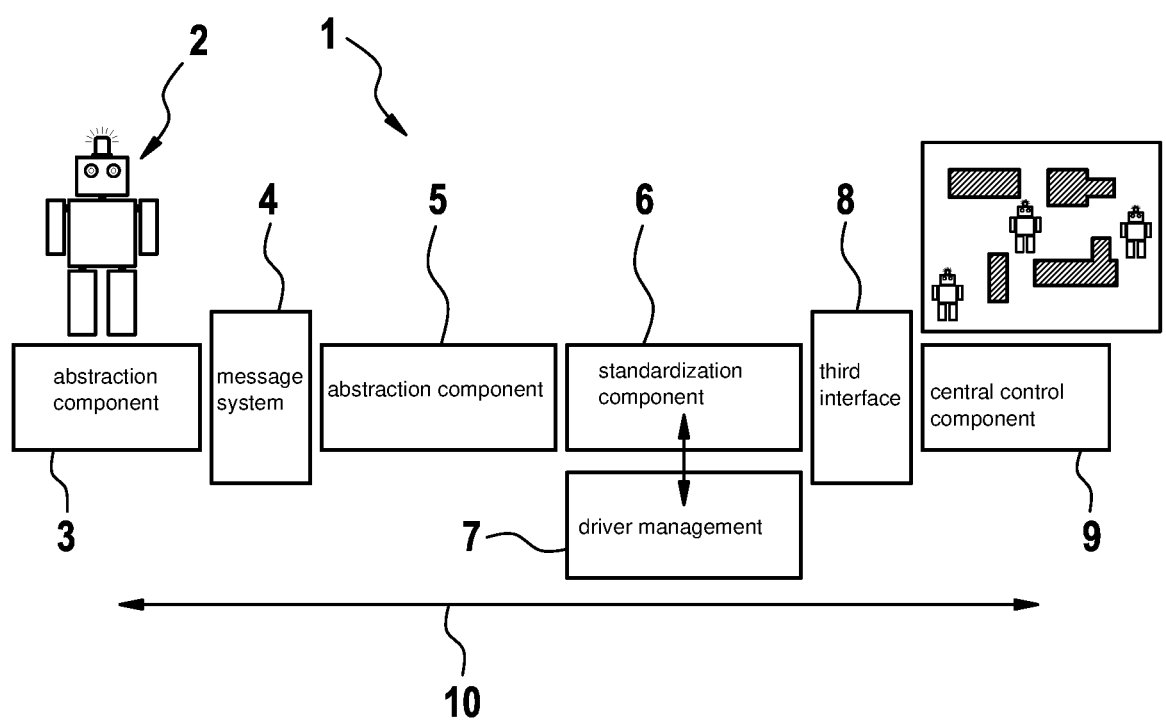
FIG. 1 shows by way of example a data processing system for controlling different types of mobile platforms.

FIG. 1 illustrates by way of example a data processing system 1 for controlling a multitude of types of mobile platforms. Mobile platforms in the form of robots, for example, are illustrated in FIG. 1. The present invention is also applicable to other mobile platforms, however, in particular, to vehicles such as, for example, passenger cars or trucks.

Data processing system 1 includes an abstraction component 3, 5, a standardization component 6 and a driver management 7. The abstraction component 3, 5 is designed to be connected to a first mobile platform 2, to determine a first type of first mobile platform 2 and to communicate with driver management 7 in order to indicate to the driver management the first type of the first mobile platform. Driver management 7 is designed to provide a first driver as a function of the indicated first type of abstraction component 3, 5. Abstraction component 3, 5 includes a first interface to first mobile platform 2 and a second interface to standardization component 6 and is designed to convert messages between the first interface and the second interface, to activate functions of the first mobile platform via the first interface and/or to activate functions of the standardization component via the second interface using the first driver provided by driver management 7. The first interface of abstraction component 3, 5 in this case includes an interface to a software component of the first mobile platform. This software component may, for example, be a software provided by the manufacturer of the first mobile platform.

The abstraction component includes a first mobile abstraction element 3 and a central abstraction element 5. Data processing system 1 may further include a central data processing device and a first mobile data processing device. The central data processing device in this case includes central abstraction element 5, driver management 7 and standardization component 6. The first mobile data processing device further includes first mobile abstraction element 3. Central abstraction element 5, driver management 7 and standardization component 6 may be software components, which are implemented by the central data processing device. First mobile abstraction element 3 may further be a software component, which is implemented by the first mobile data processing device.

First mobile data processing device may be permanently connected to first mobile platform 2. The first interface may, in particular, connect first mobile platform 2 to the first mobile data processing device, and the first mobile data processing device may be connected via a message system 4, in particular, a wireless message system, to the central data processing device.

First mobile abstraction element 3 and central abstraction element 5 are thus designed to communicate with one another via message system 4. For this purpose, a message-oriented network protocol is preferably used, which enables both a targeted as well as an open communication according to the queuing principle. For example, first mobile abstraction element 3 and central abstraction element 5 may be designed to exchange messages using the MQTT protocol.

Abstraction component 3, 5 may further be designed to communicate with driver management 7 in order to ensure the compatibility of a mobile platform with data processing system 1 and to prevent an unintended connection to an incompatible mobile platform.

Abstraction component 3, 5 may be designed to be connected to further mobile platforms, to determine types of the further mobile platforms and to indicate to driver management 7 the types of the further mobile platforms. Driver management 7 may further be designed to provide further drivers for abstraction component 3, 5 as a function of the indicated types of the further mobile platforms, so that the abstraction component is able to convert messages between the second interface and further interfaces to the further mobile platforms and to activate functions of the further mobile platforms and of the standardization component using the further drivers provided by the driver management. In the process, the communication between abstraction component and driver management may take place via the standardization component. The abstraction component may, in particular, be designed to indicate types of the further mobile platforms to the standardization component, and the standardization component may be designed to send indicators of the further mobile platforms to the driver management. The driver management may be further designed to send the further drivers to the abstraction component via the standardization component.

Standardization component 6 is preferably designed to provide a control of first mobile platform 2 to control component 9, which is a function of the position of the first mobile platform, of positions of further mobile platforms connected to abstraction component 3, 5 and/or of a condition of the surroundings of the first mobile platform.

Data processing system 1 further includes a central control component 9, standardization component 6 being designed to provide via a third interface 8 functions and/or messages for the central control component for controlling mobile platforms. In this case, multiple or all of the functions and/or messages provided by the standardization component for controlling mobile platforms are independent of the type of the controlled mobile platform.

Standardization component 6 may further be designed to receive messages from the abstraction component via the second interface, to combine the received messages while taking pieces of context information into account, and forwarding the combined messages via third interface 8 to central control component 9.

Standardization component 6 and central control component 9 in this case may be designed to exchange messages via a message-oriented network protocol, which enables both a targeted as well as an open communication according to the queuing principle. For example, AMQP may be used for the communication between standardization component 6 and central control component 9.

The signal flow is illustrated by 10.

Data processing system 1 may be designed, in particular, to activate a steering system, a driver system and/or a brake system of first mobile platform 2.

Applications, for example, in which multiple robots of different types interact in a coordinated manner, may be implemented via the central control component. In this way, robots may be used with greater efficiency and reliability. To implement such applications, personnel therefore need only learn the programming of the central control component. The implementation of applications using multiple robots of different types is enabled or at least drastically simplified as a result. Moreover, in applications that include multiple subtasks, the central control component is able to select and use the robots best suited for the respective subtasks.

Figure 2:
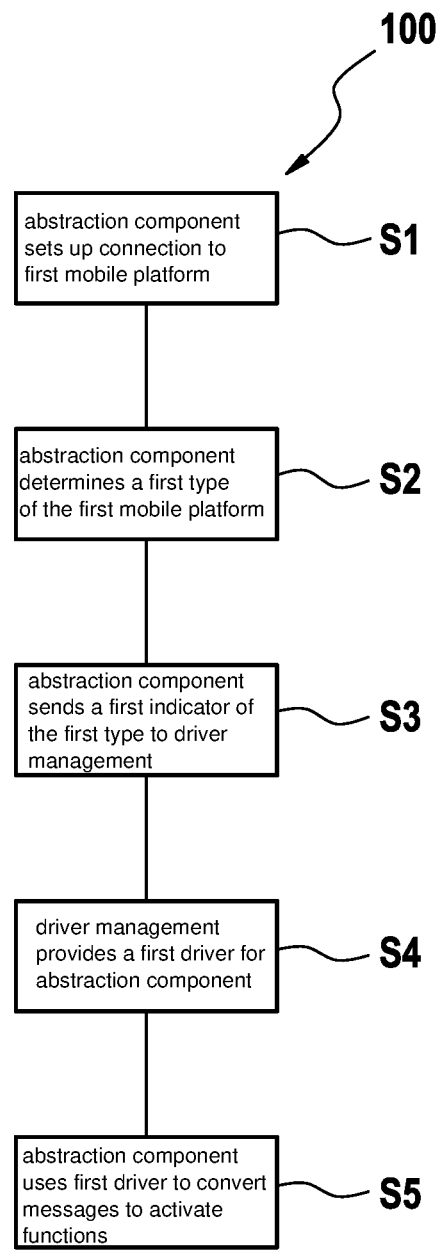
FIG. 2 shows by way of example a method for controlling different types of mobile platforms.

FIG. 2 illustrates by way of example a computer-implemented method 100 for controlling a multitude of types of mobile platforms.

In step S1, the abstraction component sets up a connection to a first mobile platform, so that in addition to a second interface to a standardization component, the abstraction component includes a first interface to the first mobile platform.

In step S2, the abstraction component determines a first type of the first mobile platform.

In step S3, the abstraction component sends a first indicator of the first type of the first mobile platform to the driver management.

In step S4, the driver management provides a first driver for the abstraction component as a function of the first indictor.

In step S5, the abstraction component uses the first driver provided by the driver management in order to convert messages between the first interface and the second interface, in order to activate functions of the first mobile platform via the first interface and/or in order to activate functions of the standardization component via the second interface. In this case, the first interface of the abstraction component may include an interface to a software component of the first mobile platform, i.e., the abstraction component is set on a software of the first mobile platform that has been provided, for example, by the manufacturer of the first mobile platform.

Method 100 may further include the setting up of connections to further mobile platforms via the abstraction component. Furthermore, the abstraction component may determine types of the further mobile platforms and transfer indicators of the types of the further mobile platforms to the driver management. The driver management may provide further drivers for the abstraction component as a function of the further indicators. The abstraction component may use the further drivers provided by the driver management in order to convert messages between the second interface and the further interfaces to the further mobile platforms, to activate functions of the further mobile platforms via the further interfaces and/or to activate functions of the standardization component via the second interface.

What is claimed is:

1. A data processing system for controlling a multitude of types of mobile platforms, the data processing system comprising:
   an abstraction component;
   a standardization component; and
   a driver management;
   wherein the abstraction component is configured to be connected to a first mobile platform, to determine a first type of the first mobile platform, and to communicate with the driver management to indicate to the driver management the first type of the first mobile platform;
   wherein the driver management being configured to provide a first driver as a function of the indicated first type of the abstraction component;
   wherein the abstraction component includes a first interface to the first mobile platform and a second interface to the standardization component, the abstraction component being configured to convert messages between the first interface and the second interface, and/or to activate functions of the first mobile platform via the first interface, and/or to activate functions of the standardization component via the second interface, using the first driver provided by the driver management; and
   wherein the first interface of the abstraction component includes an interface to a software component of the first mobile platform.

2. The data processing system as recited in claim 1, wherein:
   the abstraction component is configured to be connected to further mobile platforms, to determine types of the further mobile platforms, and to indicate to the driver management the types of the further mobile platforms;
   the driver management is configured to provide further drivers for the abstraction component as a function of the indicated types of the further mobile platforms;
   the abstraction component includes further interfaces to the further mobile platforms; and
   the abstraction component being configured to convert messages between the second interface and the further interfaces to the further mobile platforms, and/or to activate functions of the further mobile platforms via the further interfaces, and/or to activate functions of the standardization component via the second interface, using the further drivers provided by the driver management.

3. The data processing system as recited in claim 1, wherein the standardization component is configured to provide a control of the first mobile platform, which is a function of a position of the first mobile platform, and/or of positions of further mobile platforms connected to the abstraction component, and/or of a condition of surroundings of the first mobile platform.

4. The data processing system as recited in claim 1, further comprising:
   a central control component;
   wherein the standardization component is configured to provide via a third interface functions and/or messages for the central control component for controlling mobile platforms; and
   wherein multiple of the functions and/or messages provided by the standardization component for controlling mobile platforms are independent of a type of the controlled mobile platform.

5. The data processing system as recited in claim 4, wherein the standardization component is configured to receive messages from the abstraction component via the second interface, to combine the received messages while taking pieces of context information into account, and to forward the combined messages via the third interface to the central control component.

6. The data processing system as recited in claim 4, wherein the standardization component and the central control component are configured to exchange messages via a first network protocol, the first network protocol being a message-oriented network protocol, which enables both a targeted and an open communication according to a queuing principle.

7. The data processing system as recited in claim 1, wherein the data processing system includes a central data processing device and a first mobile data processing device, the first interface connecting the first mobile platform to the first mobile data processing device, and the first mobile data processing device being connected to the central data processing device via a wireless communication system.

8. The data processing system as recited in claim 7, wherein the abstraction component includes a central abstraction element and a first mobile abstraction element, the central data processing device includes the central abstraction element, the driver management, and the standardization component, and wherein the first mobile data processing device includes the first mobile abstraction element.

9. The data processing system as recited in claim 8, wherein the central abstraction element and the first mobile abstraction element are configured to exchange messages using a second network protocol, the second network protocol being a message-oriented network protocol, which enables both a targeted and an open communication according to a queuing principle.

10. A computer-implemented method, comprising the following steps:
    setting up a connection to a first mobile platform by an abstraction component, the abstraction component including a first interface to the first mobile platform and a second interface to a standardization component;
    determining a first type of the first mobile platform by the abstraction component;
    sending a first indicator of the first type of the first mobile platform from the abstraction component to a driver management;
    providing a first driver for the abstraction component by the driver management as a function of the first indicator;
    using the first driver provided by the driver management by the abstraction component to convert messages between the first interface and the second interface, and/or to activate functions of the first mobile platform via the first interface, and/or to activate functions of the standardization component via the second interface; and
    wherein the first interface of the abstraction component includes an interface to a software component of the first mobile platform.

11. The computer-implemented method as recited in claim 10, further comprising:
    setting up connections to further mobile platforms, by the abstraction component, the abstraction component including further interfaces to the further mobile platforms;
    determining types of the further mobile platforms by the abstraction component,
    transferring further indicators of the types of the further mobile platforms from the abstraction component to the driver management;
    providing further drivers for the abstraction component by the driver management as a function of the further indicators;
    using the further drivers, provided by the driver management, by the abstraction component to convert messages between the second interface and the further interfaces to the further mobile platforms, and/or to activate functions of the further mobile platforms via the further interfaces, and/or to activate functions of the standardization component via the second interface.

12. A non-transitory computer-readable memory medium on which is stored a computer program including an abstraction component, a standardization component, and a driver management, the computer program, when executed by a computer, causing the computer to perform:
    setting up a connection to a first mobile platform by the abstraction component, the abstraction component including a first interface to the first mobile platform and a second interface to the standardization component;
    determining a first type of the first mobile platform by the abstraction component;
    sending a first indicator of the first type of the first mobile platform from the abstraction component to the driver management;
    providing a first driver for the abstraction component by the driver management as a function of the first indicator;
    using the first driver provided by the driver management by the abstraction component to convert messages between the first interface and the second interface, and/or to activate functions of the first mobile platform via the first interface, and/or to activate functions of the standardization component via the second interface; and
    wherein the first interface of the abstraction component includes an interface to a software component of the first mobile platform.

* * * * *